(12) United States Patent
Anand et al.

(10) Patent No.: US 8,886,208 B2
(45) Date of Patent: Nov. 11, 2014

(54) METHOD AND APPARATUS OF SIMULTANEOUSLY MONITORING GSM CHANNELS

(71) Applicant: QUALCOMM Incorporated, San Diego, CA (US)

(72) Inventors: Raghavendra S. Anand, Hyderabad (IN); Javed Shamim Malik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/744,648

(22) Filed: Jan. 18, 2013

(65) Prior Publication Data
US 2013/0244673 A1 Sep. 19, 2013

Related U.S. Application Data

(60) Provisional application No. 61/612,750, filed on Mar. 19, 2012.

(51) Int. Cl.
| | |
|---|---|
| *H04W 24/02* | (2009.01) |
| *H04W 48/16* | (2009.01) |
| *H04W 24/10* | (2009.01) |
| *H04W 52/02* | (2009.01) |
| *H04W 88/06* | (2009.01) |

(52) U.S. Cl.
CPC .......... *H04W 24/02* (2013.01); *H04W 52/0229* (2013.01); *H04W 88/06* (2013.01); *H04W 48/16* (2013.01); *H04W 24/10* (2013.01)
USPC ........................................ 455/450; 455/452.1

(58) Field of Classification Search
CPC .................... H04W 72/0453; H04W 72/0413; H04W 28/06; H04W 24/10; H04W 88/06; H04W 48/16

USPC ................... 455/414.1, 436, 437, 450, 452.1; 370/252, 338

See application file for complete search history.

(56) References Cited

U.S. PATENT DOCUMENTS

| | | | |
|---|---|---|---|
| 6,205,334 | B1 | 3/2001 | Dent |
| 7,986,661 | B2 | 7/2011 | Bhattacharjee et al. |
| 8,204,013 | B2 | 6/2012 | Lewis |
| 8,238,929 | B2 | 8/2012 | Ben-Eli et al. |
| 2004/0204035 | A1 | 10/2004 | Raghuram et al. |
| 2007/0037601 | A1 | 2/2007 | Mittal et al. |

FOREIGN PATENT DOCUMENTS

EP 2249608 A1 11/2010

OTHER PUBLICATIONS

International Search Report and Written Opinion—PCT/US2013/032793—ISA/EPO—Jul. 3, 2013.

*Primary Examiner* — Sam Bhattacharya
(74) *Attorney, Agent, or Firm* — QUALCOMM IP Department; James Hunt Yancey, Jr.

(57) ABSTRACT

Methods and apparatuses of simultaneously monitoring GSM channels are provided. One feature pertains to a method of monitoring radio channels in a wireless communication device that includes associating with a serving base station by establishing, at least periodically, a communication link with the serving base station. A method can also include receiving a signal having a bandwidth using a first receiver, where the signal includes a plurality of channels each associated with a first technology type network, and the plurality of channels includes a first channel associated with the serving base station and at least a second channel associated with a non-serving base station. Other aspects, embodiments, and features are also claimed and described.

39 Claims, 9 Drawing Sheets

METHOD AND APPARATUS OF SIMULTANEOUSLY MONITORING GSM CHANNELS

PRIORITY CLAIM

This patent application claims priority to U.S. Provisional Patent Application No. 61/612,750 entitled "Method and Apparatus of Simultaneously Monitoring GSM Channels" filed Mar. 19, 2012, the entire disclosure of which is hereby expressly incorporated by reference herein.

TECHNICAL FIELD

The technology discussed in this patent application relates generally to wireless communication devices, and more particularly, to methods and apparatuses for monitoring radio channels.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Some wireless communication devices may be configured to facilitate communication on a single network with one subscription, while other devices can communicate on two separate networks via two separate subscriptions. For instance, a single network device may include a GSM device having a single subscriber identity module (SIM). Another multi-network device may include a dual-SIM, dual standby (DSDS) device that has two SIM cards: one for each subscription. Furthermore, each subscription may be associated with one or more technology type. For example, a first subscription may exclusively support 2G communication technology, such as GSM, while the second subscription may support one or more of 3G communication technologies (e.g., WCDMA) and/or 4G communication technologies (e.g., Long Term Evolution (LTE)).

In GSM, a wireless device in idle mode is required to measure and monitor the power levels in absolute radio-frequency channel numbers (ARFCNs) (hereinafter "channel") where a broadcast control channel (BCCH) is expected or detected. Typically, the wireless device's receiver is tuned to each specific channel and the power in that channel is measured. After measuring the power in one specific channel, the receiver tunes to a subsequent channel and begins to perform another power level determination for that subsequent channel. This process continues, channel by channel until all the channel powers are measured. As such, receiver tuning overhead is considerable when the number of channels to be monitored is high. For a single SIM GSM device in idle mode, this measuring and monitoring procedure consumes significant power. For a DSDS device, significant dead time is spent on performing these idle mode GSM procedures when the device is in a WCDMA dedicated mode. Accordingly, current idle mode operation of GSM devices may result in wasted resources, such as high power consumption in the case of the single SIM GSM device, and reduced WCDMA throughput in the DSDS case.

BRIEF SUMMARY OF SOME EXAMPLE EMBODIMENTS

The following presents a summary of one or more aspects of the present disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One feature provides a method of monitoring radio channels in a wireless communication device that comprises associating with a serving base station by establishing, at least periodically, a communication link with the serving base station, receiving a signal having a bandwidth using a first receiver, the signal including a plurality of channels each associated with a first technology type network, the plurality of channels including a first channel associated with the serving base station and at least a second channel associated with a non-serving base station, demodulating a first data signal of the first channel, and determining a power level metric of the second channel. According to one aspect, the method further comprises transitioning the first receiver from an inactive power state to an active power state for a predefined period of time to receive the signal. According to another aspect, the method further comprises determining to make signal measurements prior to transitioning the first receiver from the inactive power state to the active power state. According to yet another aspect, the determining to make signal measurements includes determining to perform a Global System for Mobile Communications (GSM) idle mode scan, the plurality of channels comprising GSM channels having a 200 kHz bandwidth.

According to one aspect, the method further comprises receiving signals associated with a second technology type network, the second technology type network different from the first technology type network. According to another aspect, the first technology type network is based on time division multiple access (TDMA) and the second technology type network is based on code division multiple access (CDMA). According to yet another aspect, the first technology type network is GSM, and the second technology type network is Wideband Code Division Multiple Access (W-CDMA) or Long Term Evolution (LTE).

According to one aspect, the method further comprises associating with the non-serving base station after determining the power level of the second channel exceeds a predefined threshold. According to another aspect, the bandwidth of the signal is greater than or equal to three (3) times a channel bandwidth of each of the plurality of channels associated with the first technology type network. According to yet another aspect, the bandwidth of the signal is substantially equal to a channel bandwidth of a carrier associated with the second technology type network.

According to one aspect, the bandwidth is greater than or equal to five (5) MHz and the plurality of channels each have a channel bandwidth of 200 kHz. According to another aspect, the first data signal is one of a synchronization channel, a broadcast control channel, or a paging control channel. According to yet another aspect, the first receiver has a receiver bandwidth that includes a substantially linear phase response for at least 200 kHz.

According to one aspect, the method further comprises applying a compensation filter to the received signal to correct for gain loss at a lower edge and an upper edge of the signal's bandwidth. According to another aspect, the method further comprises applying a tunable band pass filter to the received signal to extract each channel of the plurality of channels. According to yet another aspect, the method further comprises determining that the power level metric of the second channel satisfies a cell reselection criteria or a handover criteria, performing a cell reselection if the wireless communication device is in a non-dedicated mode, and performing a handover if the wireless communication device is in a dedicated mode.

According to one aspect, the power level metric satisfies the cell reselection criteria or the handover criteria when at least one of an absolute power level of the second channel exceeds a first predefined threshold, a relative power level of the second channel exceeds a power level of the first channel by at least a second predefined threshold, an absolute signal to noise ratio (SNR) of the second channel exceeds a third predefined threshold, a relative signal strength indicator (RSSI) of one of the second channel exceeds a fourth predefined threshold, and/or a relative SNR of the second channel exceeds an SNR value of the first channel by a fifth predefined threshold. According to another aspect, the first data signal of the first channel is demodulated and the power level metric of the second channel is determined without retuning an RF center frequency of the first receiver.

Another feature provides a wireless communication device comprising a first receiver adapted to associate with a serving base station by establishing, at least periodically, a communication link with the serving base station, and receive a signal having a bandwidth, the signal including a plurality of channels each associated with a first technology type network, the plurality of channels including a first channel associated with the serving base station and at least a second channel associated with a non-serving base station, and a processing circuit communicatively coupled to the first receiver, the processing circuit adapted to demodulate a first data signal of the first channel, and determine a power level metric of the second channel. According to one aspect, the processing circuit is further adapted to transition the first receiver from an inactive power state to an active power state for a predefined period of time to receive the signal. According to another aspect, the processing circuit is further adapted to determine to make signal measurements prior to transitioning the first receiver from the inactive power state to the active power state. According to yet another aspect, the processing circuit adapted to determine to make signal measurements further causes the processing circuit to determine to perform a Global System for Mobile Communications (GSM) idle mode scan, the plurality of channels comprising GSM channels having a 200 kHz bandwidth.

According to one aspect, the first receiver is further adapted to receive signals associated with a second technology type network different from the first technology type network. According to another aspect, the first receiver is further configured to associate with the non-serving base station after the processing circuit determines that the power level of the second channel exceeds a predefined threshold. According to yet another aspect, the first data signal is a burst data signal.

According to one aspect, the processing circuit is further adapted to apply a compensation filter to the received signal to correct for gain loss at a lower edge and an upper edge of the signal's bandwidth. According to another aspect, the processing circuit is further adapted to apply a tunable band pass filter to the received signal to extract each channel of the plurality of channels. According to yet another aspect, the processing circuit is further adapted to determine that the power level metric of the second channel satisfies a cell reselection criteria or a handover criteria, perform a cell reselection if the wireless communication device is in a non-dedicated mode, and perform a handover if the wireless communication device is in a dedicated mode. According to yet another aspect, the wireless communication device further comprises a second narrowband receiver communicatively coupled to the processing circuit and having a second bandwidth (e.g., 200 kHz) less than the signal bandwidth, wherein the second receiver is adapted to receive only a single channel of the plurality of channels of the first technology type network at once.

Another feature provides a wireless communications device that comprises means for associating with a serving base station by establishing, at least periodically, a communication link with the serving base station, means for receiving a signal having a bandwidth, the signal including a plurality of channels each associated with a first technology type network, the plurality of channels including a first channel associated with the serving base station and at least a second channel associated with a non-serving base station, means for demodulating a first data signal of the first channel, and means for determining a power level metric of the second channel. According to one aspect, the wireless communication device further comprises means for transitioning the means for receiving from an inactive power state to an active power state for a predefined period of time to receive the signal. According to another aspect, the wireless communication device further comprises means for determining that the power level metric of the second channel satisfies a cell reselection criteria or a handover criteria, means for performing a cell reselection if the wireless communication device is in a non-dedicated mode, and means for performing a handover if the wireless communication device is in a dedicated mode.

Another feature provide a computer-readable storage medium comprising code for causing at least one processor of a wireless communication device to associate with a serving base station by establishing, at least periodically, a communication link with the serving base station, receive a signal having a bandwidth using a first receiver, the signal including a plurality of channels each associated with a first technology type network, the plurality of channels including a first channel associated with the serving base station and at least a second channel associated with a non-serving base station, demodulate a first data signal of the first channel, and determine a power level metric of the second channel. According to one aspect, the computer-readable storage medium comprises code for further causing the processor to transition the first receiver from an inactive power state to an active power state for a predefined period of time to receive the signal. According to another aspect, the computer-readable storage medium comprises code for further causing the processor to determine that the power level metric of the second channel satisfies a cell reselection criteria or a handover criteria, perform a cell reselection if the wireless communication device is in a non-dedicated mode, and perform a handover if the wireless communication device is in a dedicated mode.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
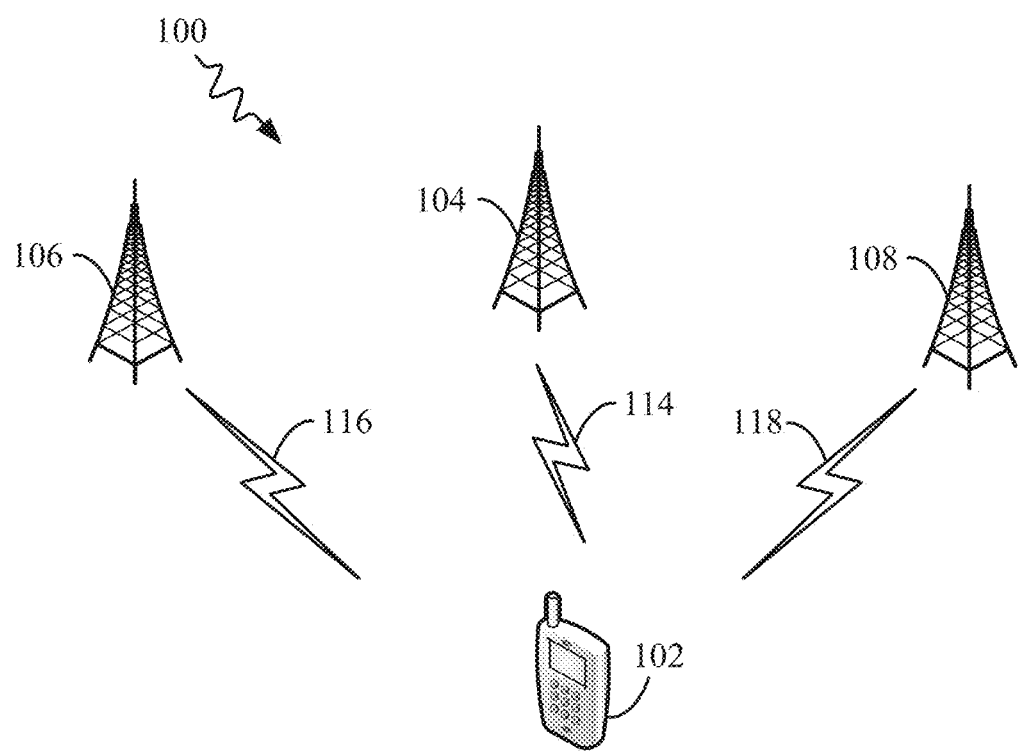
FIG. 1 illustrates a schematic view of an exemplary network environment according to some embodiments.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. As used herein, the term "base station" is not associated with any one single wireless communication standard, and thus may include base transceiver stations (BTS), node Bs, evolved node Bs, etc. As used herein, the term "wideband receiver" refers to a radio receiver having a bandwidth (i.e., the difference between the upper and lower cut-off frequencies of the receiver) that is at least equal to or greater than three times the bandwidth of a single channel associated with a communication/network technology type received by the receiver. For example, a receiver having a bandwidth of 600 kHz or greater may thus be a "wideband receiver" if it is used to receive GSM channels having a 200 kHz bandwidth. A "wideband signal" refers to the signal captured by the wideband receiver.

Generally, references herein to Global System for Mobile Communications (GSM) refer to the standards and protocols described in versions 11 or earlier of the GSM communications standard. For example, GSM radio link control (RLC) layer protocols, such as "idle mode" states of operation in GSM, may be found in at least 3GPP TS 45.022, v11.0.0 or earlier versions. Similarly, general references herein to wideband code division multiple access (W-CDMA), Long Term Evolution (LTE), and (Universal Mobile Telecommunications System) refer to the standards and protocols described in versions 11 or earlier of the W-CDMA, UMTS and LTE communications standards. For example, radio link control (RLC) layer protocols for W-CDMA, UMTS, and LTE may be found in at least 3GPP TS 25.322, v11.0.0 or earlier versions.

Overview

In GSM, a wireless device is required to periodically monitor neighboring cells' base station powers. The GSM wireless device is also required to maintain synchronization with neighboring base stations by decoding a synchronization channel (SCH) and a broadcast control channel (BCCH). The wireless device performs these monitoring, measuring, and decoding steps in an idle mode procedure, which may be referred to as a cell reselection procedure. When the wireless device is in idle mode, power consumed for these idle mode procedures is proportional to power ON time spent (e.g., time outside of a low power SLEEP mode or OFF mode) in a discontinuous reception (DRX) cycle. As such, reducing the total ON time reduces the idle mode power usage.

When the wireless device is in dedicated mode, e.g., during a call, and has only a single SIM, the 3GPP standards provide a tune away time to complete up to six (6) neighbor cell measurements, but not enough time to observe a complete GSM band of operation. As such, a more complete and/or frequent picture of what is happening in the entire GSM band of operation is desired to enhance the chances of sustaining the call.

When the wireless device is a DSDS device, and the GSM SIM is in idle mode and the WCDMA SIM is in dedicated mode, the time spent performing the GSM idle mode procedures adds a penalty to WCDMA throughput. Thus, in at least one aspect, the described apparatus and methods reduce the time taken for GSM IDLE mode procedures in such a way that the number of absolute radio-frequency channel numbers (ARFCNs) monitored is more than prior art solutions. Specifically, the described aspects utilize a wideband receiver to reduce the number of RF tune in (i.e., the RF receiver is turned ON and captures a signal) and RF tune away (i.e., RF receiver is turned OFF or enters a low power mode) occasions. This helps increase the ratio of useful RF time (e.g., actual time spent capturing signals and making measurements) to total RF time expended including time spent turning ON/OFF the RF receiver and time spent tuning to different channel frequencies.

By contrast, some present solutions employ inefficient methods that spend time tuning to each ARFCN (200 kHz bandwidth channel) individually to measure power. The procedure may be repeated for each ARFCN in the band until all the ARFCNs are covered. For instance, in one example, the described apparatus and methods may include, but are not limited to, using a wideband WCDMA receiver for GSM measurements. In this case, for example, one or more of the described aspects herein may perform measure 25 ARFCNs during a TDMA frame (e.g., 4.615 ms. By contrast, prior art solutions may only measure 4 ARFCNs during the TDMA frame. Moreover, for example, the described aspects may complete an entire GSM band scan in five measurements, which may take less than 10 ms total to complete.

Exemplary Network Environment

FIG. 1 illustrates a schematic view of an exemplary network environment 100 according to one aspect of the disclosure. A wireless communication device 102 (e.g., mobile phone, laptop computer, etc.,) may be associated with a serving base station 104. That is, the wireless device 102 may be "camped on" the serving base station 104 such that it may establish, at least periodically, a communication link 114 with the serving base station 104. In the illustrated example the base station 104 may at the present time be the serving base station for the wireless device 102 because the device 102 may be in close proximity to the base station 104 and/or is able to establish communication links with the base station 104 that have a high signal to noise ratio (SNR) compared to other neighboring base stations 106, 108. The wireless device 102 may also occasionally receive signals 116, 118, such as pilot signals, from the non-serving base stations 106, 108 to determine whether to perform a hand off or cell reselection based on the power level of the received signals 116, 118. For example, because the wireless device 102 may have moved closer to the base station 108, it may determine that the base station's received signal 118 is stronger (e.g., higher SNR) than its existing serving base station's signal 114, and thus, the wireless device 102 may perform a cell reselection such that the base station 108 becomes the new serving base station.

The signals 114, 116, 118 received by the wireless device 102 from the base stations 104, 106, 108 are each transmitted over a specific channel (e.g., ARFCN) of a plurality of channels with a band associated with a first technology type network (e.g., GSM). Each channel may have the same bandwidth (e.g., 200 kHz) but a different center frequency so that the channels do not overlap. For example, the first signal 114, the second signal 116, and the third signal 118 may be centered at 890.100 MHz, 890.300 MHz, and 890.5 MHz, respectively. As another example, the first signal 114, the second signal 116, and the third signal 118 may be centered at 890.100 MHz, 894.700 MHz, and 901.5 MHz, respectively. Other neighboring base stations (not shown) may occupy different channels having different channel numbers with different center frequencies.

Figure 2:
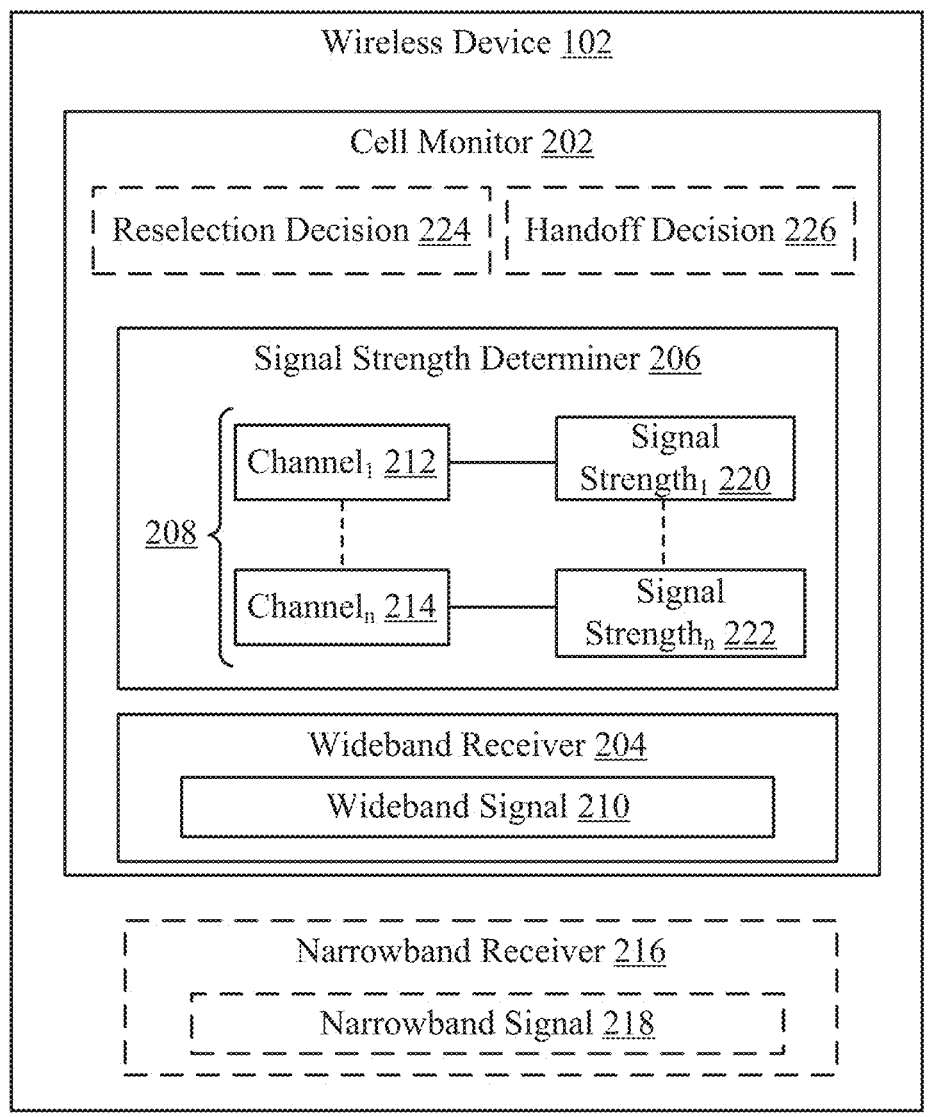
FIG. 2 illustrates a schematic view of a wireless device according to some embodiments.

FIG. 2 illustrates a schematic view of the wireless device 102 according to one aspect. Among other things, the wireless device 102 includes a cell monitor module 202 that has a wideband receiver (e.g., first receiver) 204 and a signal strength determiner module 206.

In one aspect, the wireless device 102 performs simultaneous measurement of a plurality of channels (e.g., GSM channels) using the cell monitoring module 202. The cell monitoring module 202 may be configured to allow signal measurements to be taken for a set of channels 208 defining a band of the first technology type network (e.g., GSM network). For example, the cell monitoring module 202 may perform a GSM idle mode cell measurement and monitoring procedure, such as a cell reselection or handover procedure, to identify cell reselection or handover candidates based on signal measurements and/or to maintain synchronization with neighboring cells (i.e., base stations of the neighboring cells) by decoding a synchronization channel (SCH) and/or a broadcast control channel (BCCH).

Referring to FIGS. 1 and 2, in one example, the cell monitoring module 202 may initiate periodic monitoring for and measuring of signals 116 and 118, such as pilot signals, broadcast by the neighboring base stations 106 and 108 adjacent to the serving base station 104 currently associated with wireless device 102. In the idle mode, such a cell measurement and monitoring procedure allows the wireless device 102 to determine a signal power, such as a received signal strength indicator (RSSI), which can be used to reselect a new base station on which to camp (i.e., associate with). For example, if a power level metric (e.g., SNR, absolute power level, relative power level, RSSI) of one of the neighboring base stations 106, 108 (e.g., station broadcasting "second channel") satisfies a cell reselection criteria relative to a power of the serving base station 104 (e.g., station broadcasting "first channel"), then the wireless device 102 may select one of the neighboring base stations 106, 108 as the new serving base station. For instance, the cell reselection criteria may be satisfied if: the absolute power level of one of the non-serving neighboring base stations 106, 108 exceeds a predefined threshold; the power level of one of the non-serving neighboring base stations 106, 108 is relatively higher than the serving base station 104 by at least a predefined amount; the SNR of one of the non-serving neighboring base stations 106, 108 exceeds a predefined threshold; the RSSI of one of the non-serving neighboring base stations 106, 108 exceeds a predefined threshold; the SNR of one of the non-serving neighboring base stations 106, 108 is relatively higher than the serving base station 104 by at least a predefined amount; and/or the RSSI of one of the non-serving neighboring base stations 106, 108 is relatively higher than the serving base station 104 by at least a predefined amount.

In a dedicated mode, e.g. during a call, the above cell measurement and monitoring procedure may be used to identify handover candidates for the call. For example, if a power level metric (e.g., SNR, absolute power level, relative power level, RSSI) of one of the neighboring base stations 106, 108 satisfies a handover criteria relative to a power of serving base station 104, then the wireless device 102 may perform a call handover to one of the neighboring base stations 106, 108. For instance, the handover criteria may be satisfied if: the absolute power level of one of the non-serving neighboring base stations 106, 108 exceeds a predefined threshold; the power level of one of the non-serving neighboring base stations 106, 108 is relatively higher than the serving base station 104 by at least a predefined amount; the SNR of one of the non-serving neighboring base stations 106, 108 exceeds a predefined threshold; the RSSI of one of the non-serving neighboring base stations 106, 108 exceeds a predefined threshold; the SNR of one of the non-serving neighboring base stations 106, 108 is relatively higher than the serving base station 104 by at least a predefined amount; and/or the RSSI of one of the non-serving neighboring base stations 106, 108 is relatively higher than the serving base station 104 by at least a predefined amount.

The power level metric measurements may be made at the same time the wireless device 102 receives and demodulates the signal 114 (e.g., a first channel) received by the serving base station 104. Thus, the power level metric measurements may be made for adjacent channels while the wireless device 102 receives and demodulates a data signal (e.g., first data signal), such as a burst data signal, associated with the first channel without having to change (e.g., retune) the center RF frequency of the wideband receiver 204.

Further, the cell monitoring module 202 may initiate operation of the wideband receiver 204 to capture/receive a wideband signal 210 across a wide bandwidth (e.g., first bandwidth). The wideband receiver 204 may initially be in a low power SLEEP mode or OFF state (maybe referred together as an "inactive power state") and then transitioned into a power ON state (e.g., "active power state) for a predetermined period of time before the wideband receiver 204 captures the wideband signal 210. The wideband receiver 204 may be transitioned into the power ON state in response to a determination that signal measurements need to be taken.

The first bandwidth of the captured wideband signal 210 may cover/include the plurality of the set of channels 208 defining the band of the first technology type network. Power level measurements (e.g., RSSI, SNR, absolute power, relative power, etc.) may then be performed on signals associated with each channel 212, 214 that make up the set of channels 208. As such, the wireless device 102 and/or cell monitoring module 202 provides an efficient mechanism for performing the above-described monitoring and measurement procedure, as the captured wideband signal 210 enables the entire band corresponding to the set of channels 208 to be captured in a few measurements, as opposed to prior solutions that may require separate tuning to and monitoring/measuring for each of the set of channels 208.

In addition to performing power level measurements, the wideband receiver 204 may have a linear phase response so that the wireless device 102 may demodulate and/or decode at least a portion of the wideband signal 210 captured. For example, the wireless device 102 may perform power level measurements on signals 116, 118 received from neighboring base stations 106, 108 while at the same time receiving and demodulating the signal 114 transmitted by the serving base station 104. Since the receiver 204 is a wideband receiver, the signals 116, 118 may be received even though they are transmitted on different channels having center frequencies relatively far from the center frequency of the channel including the signal 114. In this fashion, the power level measurements performed on the signals 116, 118 may come free of cost since they are performed simultaneously while the wireless device 102 receives and demodulates the signal 114 from the serving base station 104, which it may be obligated to do anyway. The RF center frequency of the wideband receiver 204 does not have to be retuned/changed during this process since it has a wide enough bandwidth to receive all the channels' signals 114, 116, 118.

For example, in one aspect, the band may correspond to a GSM band, where the set of channels 208 may have a 200 kHz bandwidth and channel spacing, and each of the set of channels 208 may correspond to a respective absolute radio-frequency channel number (ARFCN). Also in this example, the wideband receiver 204 may have a bandwidth that captures/receives the wideband signal 210 across a 5 MHz bandwidth. Accordingly, the wideband signal 210 captured by wideband receiver 204 may include 25 GSM ARFCNs.

In some cases, the wideband receiver 204 may be part of a receiver or transceiver on a GSM-only capable wireless device. However, in other cases the wideband receiver 204 may be part of a receiver or transceiver on a multi-mode wireless device. For instance, the wideband receiver 204 may be used to receive data associated with a second technology type network, such as a 3G and/or 4G network including but not limited to W-CDMA and/or LTE. The wireless device 102 may also optionally include another narrowband receiver 216 (e.g., second receiver) that can also be used to receive narrowband signals 218, such as a single 200 kHz bandwidth GSM channel.

The signal strength determiner 206 may be configured to determine a respective signal strength 220, 222 of signals associated with each channel 214, 216 of the set of channels 208 defining the band of the first technology type network. The signal strengths 220, 222 may be determined by processing the wideband signal 210 captured by the wideband receiver 204. For example, the respective signal strengths 220, 222 may be signal strengths 1 to n corresponding to signals detected in each channel 212, 214 1 to n, where n is a positive integer. For instance, the signal strengths 220, 222 may be, but are not limited to, received signal strength indicators (RSSIs).

As such, in only a few iterations, the wireless device 102 and/or cell monitor module 202 can operate the wideband receiver 204 and the signal strength determiner 206 to efficiently monitor and measure all of the set of channels 208 defining the band of the first technology type network. Accordingly, the cell monitor module 202 is able to provide information for making (or itself make) a cell reselection decision 224 or handover decision 226 based on the resulting respective signal strengths 220, 222 corresponding to signals detected in each channel 212, 214 of the set of channels 208 defining the band of the first technology type network. For example, if the wireless device 102 is in an idle mode then the cell monitor module 202 may make a cell reselection decision 224, whereas it may make a handover decision 226 if the wireless device 102 is engaged in a call (i.e., dedicated mode).

It should be noted that although the cell monitor module 202 is illustrated in FIG. 2 as including the signal strength determiner 206 and the wideband receiver 204 components, each of these components may be implemented independently within the wireless device 102, or in any combination with other components of the wireless device 102. For instance, the wideband receiver 204 and the signal strength determiner 206 may be part of a receiver or transceiver subsystem or receiver chain.

Figure 3:
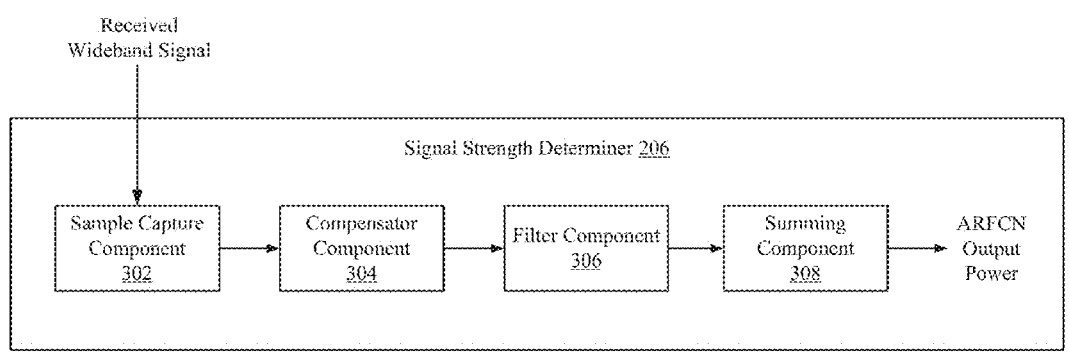
FIG. 3 illustrates a signal strength determiner according to some embodiments.

FIG. 3 illustrates the signal strength determiner 206 according to one aspect. The signal strength determiner 206 may also include one or more components for processing the captured wideband signal 210. For instance, the signal strength determiner 206 may include a sample capture component 302 configured to capture signal samples over the bandwidth of wideband receiver 204. The determiner 206 may further include a compensator component 304 configured to apply a compensation function to the sampled, captured signal. For instance, the compensator component 304 may apply an edge compensation filter to account and correct for any gain loss near the lower and upper cutoff frequencies of the wideband receiver's bandwidth.

The signal strength determiner 206 may also include a filter component 306 configured retrieve baseband signals from the captured wideband signal 210. For example, the wideband receiver 204 may be a 5 MHz bandwidth receiver. The filter component 306 may be a tunable band pass filter that retrieves samples belonging to each ARFCN within the wideband signal 210. For instance, the band pass filter may have a 200 kHz bandwidth that is tuned to align with the center frequency of each ARFCN within the wideband signal 210 in order to extract the baseband samples associated with that specific ARFCN (e.g., by removing/filtering away signal components associated with other ARFCNs).

The signal strength determiner 206 may further include a summing component 308 configured to determine, from the output of the filter component 306, the signal power of the signal samples corresponding to each channel 212, 214 of the set of channels 208 (e.g., see FIG. 2) of the band of the first technology network. For example, the summing component 308 may measure the RSSI in each specific ARFCN of the GSM band. Specifically, the filtered portion of the samples from wideband signal 210 are complex numbers, and the summing component 308 may execute a power determination algorithm equal to $\Sigma(I*I+Q*Q)$, where I in the equation stands for the in-phase (i.e., real) portion and Q stands for the quadrature-phase (i.e., imaginary) component of the complex signal. Thus, after applying baseband filter 306 (tuned to 200 kHz pass band), summing component 308 may determine the measured power of the signal as being proportional to the over-the-air (OTA) power in each particular ARFCN.

Figure 4:
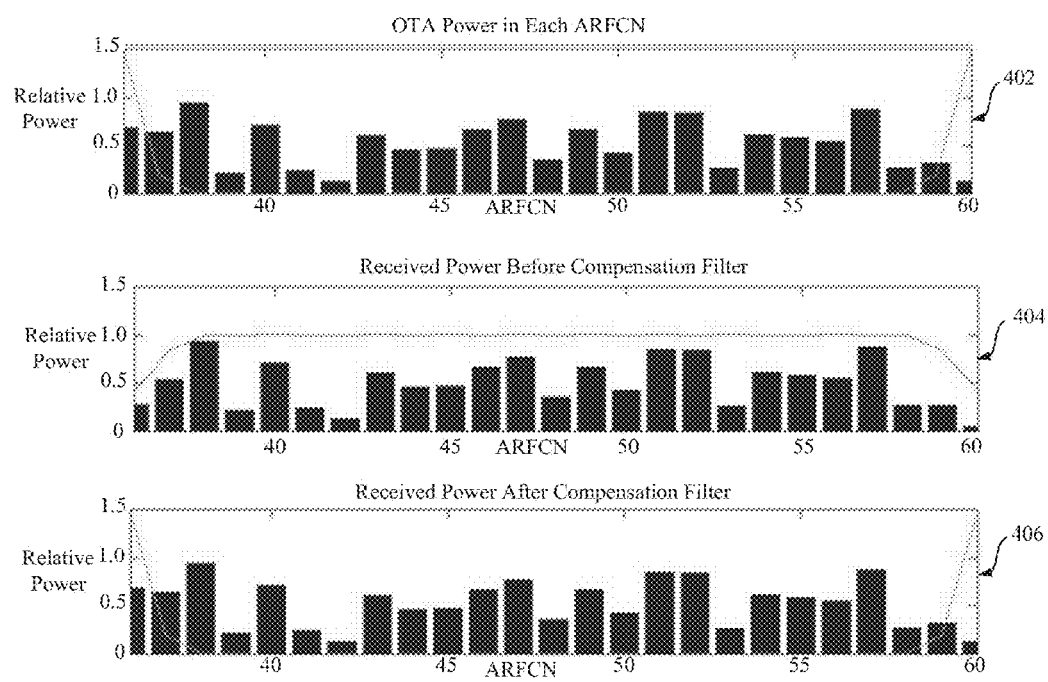
FIG. 4 illustrates a series of graphs that show the effect of a compensator component according to some embodiments.

FIG. 4 illustrates a series of graphs 402, 404, 406 that show the effect of the compensator component 304 according to one aspect. The graph 402 illustrates the over-the-air power of each ARFCN near the wireless device 102 before reception by the wireless device 102. This graph 402 represents the true power levels of the ARFCNs. The graph 404 illustrates the power levels of each ARFCN after reception by the wireless device 102, which exhibit gain loss at the lower and upper cutoff frequencies of the receiver's 204 bandwidth due to the wideband receiver's 204 frequency response. For example, the graph 404 represents the power levels of the ARFCNs at the output of the sample capture component 302. The graph 406 illustrates the power levels of each ARFCN after compensating for wideband receiver's 204 frequency response. The power levels ARFCN after compensation should be substantially equal to the power levels transmitted over the air shown in the graph 402.

The wideband receiver's 204 front end filter response—as seen by the baseband—is low pass. The compensator component 304 applies compensation for the band edge ARFCNs to correct for the gain loss. For instance, the compensation component's 304 function, algorithm, or technique can be as simple as a complex division, but may also include other techniques. If compensation is not applied, then the power estimated for ARFCNs near the edges of the wideband receiver's bandwidth will have a negative bias. Essentially, the compensator component 304 accounts for such negative bias.

Figure 5:
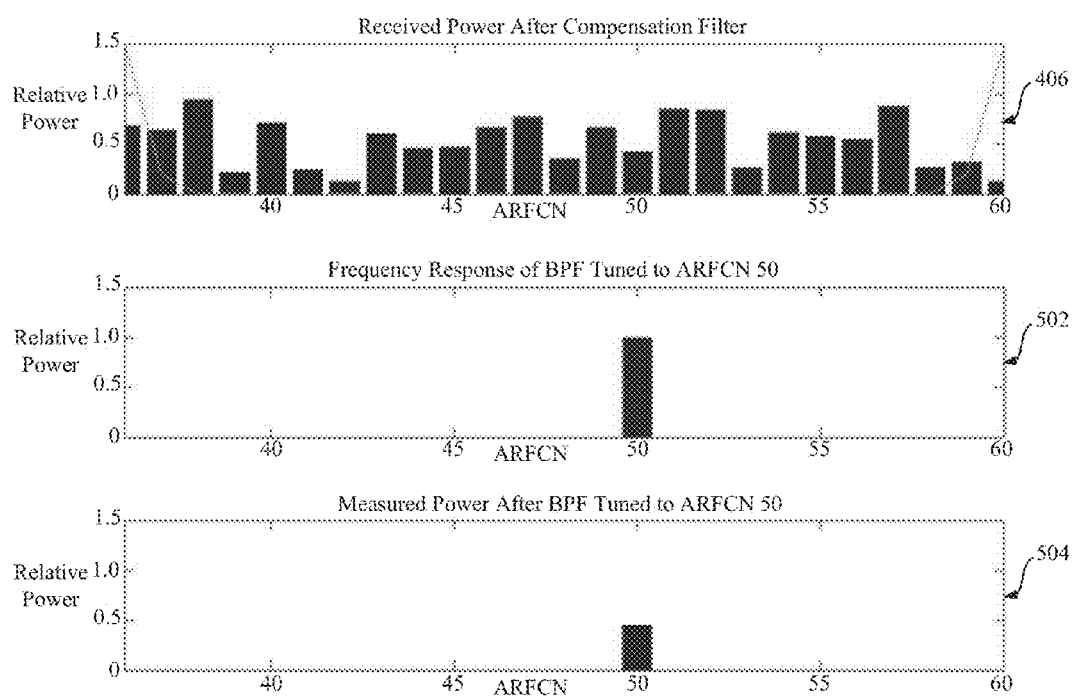
FIG. 5 illustrates a series of graphs that show the effects and properties of a filter component according to some embodiments.

FIG. 5 illustrates a series of graphs 502, 504 that show the effects and properties of the filter component 306 according to one aspect. The graph 502 shows the frequency response of the filter component 306 when it is tuned to the ARFCN 50. In this example, the filter has a 200 kHz passband. The graph 504 shows the output of the filter component 306 after the bandpass filter response shown in the graph 502 is applied to the compensated received wideband signal shown in the graph 406.

Figure 6:
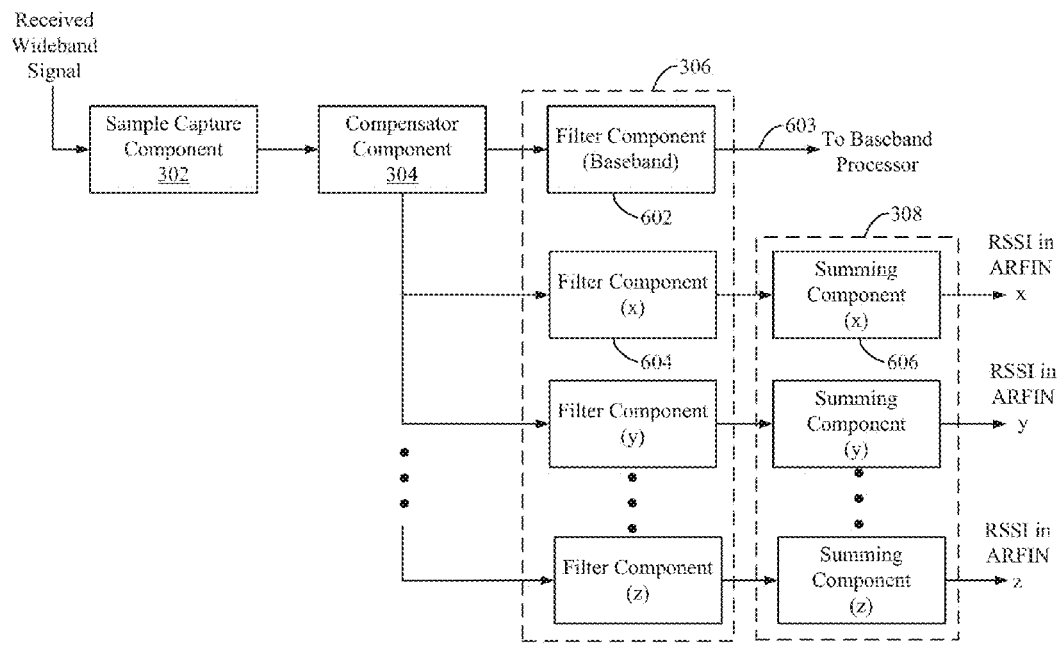
FIG. 6 illustrates a schematic view of a signal strength determiner that includes one or more components for parallel processing according to some embodiments.

FIG. 6 illustrates a schematic view of the signal strength determiner 206 that includes one or more components for parallel processing according to one aspect. The described aspects may include a digital implementation of the signal strength determiner 206 such that the filtering component 306 and the summing component 308 may include a plurality of components that operate in parallel for each ARFCN being measured. For example, a first filter 602 may be tuned to a first ARFCN that is being received from the serving base station (e.g., base station 104 in FIG. 1). This filter's 602 output signal 603 represents the signal samples associated with only that ARFCN. The output signal 603 may undergo further baseband processing (e.g., demodulation, etc.). Another filter 604 may be tuned to a second ARFCN (e.g., ARFCN x) that is being received from a non-serving base station (e.g., base station 106 in FIG. 1). The output of this filter 604 may be input into a summing component 606 that performs a summing operation in the time domain equal to $\Sigma(I*I+Q*Q)$ to determine the power level of the ARFCN. The summing component 606 may utilize a Fast Fourier Transform (FFT) to obtain the power, e.g. RSSI of the ARFCN x. Similar filter components and summing components may perform the same operations in parallel for each ARFCN captured by the wideband signal 210.

Figure 7:
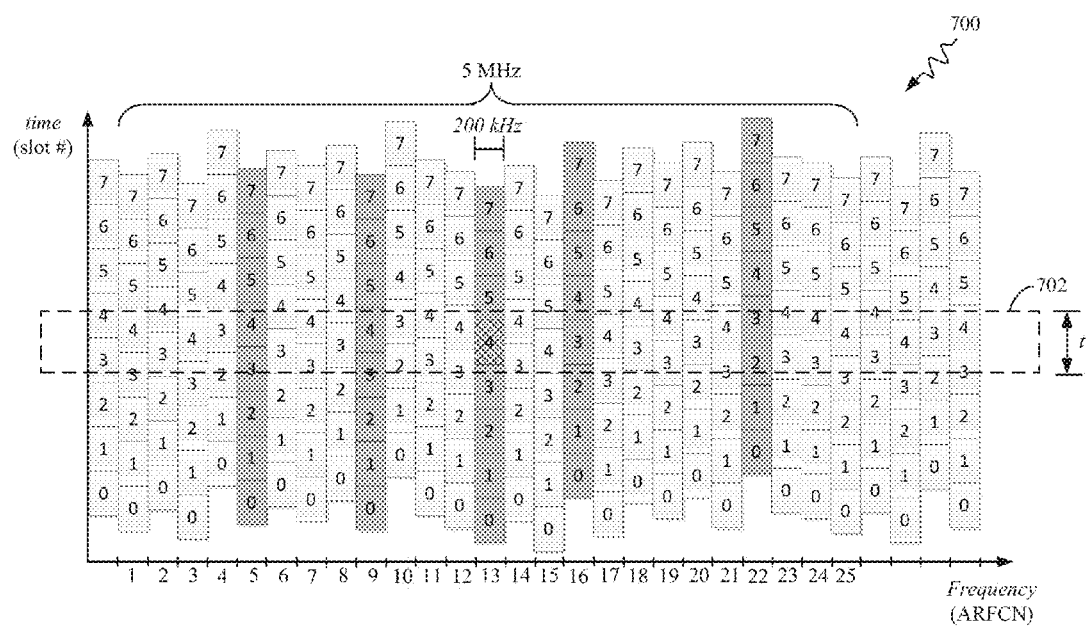
FIG. 7 illustrates a schematic plot of time versus frequency for a plurality of channels being broadcast by a plurality of base stations according to some embodiments.

FIG. 7 illustrates a schematic plot 700 of time versus frequency for a plurality of channels being broadcast by a plurality of base stations. Each channel may represent, for example, a GSM ARFCN having a channel bandwidth of 200 kHz, frames having eight (8) time slots each, and a time slot length of 0.577 ms. Of course, in other aspects the channel bandwidths, time slot lengths, frame lengths, etc. may be associated with different communication protocols and therefore have different parameter values.

Referring to FIGS. 1, 2, and 7, and as just one example, the wireless device 102 may be a multi-mode device capable of receiving both GSM and W-CDMA signals. For example, the wireless device 102 may have a wideband receiver 204 that is traditionally used for receiving W-CDMA signals and a narrow band receiver 216 that is traditionally used for receiving GSM signals. The wireless device 102 may be in a geographic region where GSM signals are located in the 900 MHz band and W-CDMA signals are located in the 2100 MHz band. As such, the wireless device 102 is capable of receiving signals in the BC5 band since the wideband receiver 204 may have a bandwidth of 5 MHz.

For example, the wideband receiver 204 having a bandwidth of 5 MHz is tuned such that it is centered on the GSM ARFCN 13 (see FIG. 7). The ARFCN 13 (e.g., first channel) may be broadcast by the serving base station 104 on which the wireless device 102 is camped on (i.e., associated with). Moreover, the wideband receiver 204 may be expecting to receive and demodulate a data signal (e.g., first data signal), such as an SCH, BCCH, or PCH burst signal on ARFCN 13 at slot 4 (e.g., the shaded and cross-hatched slot 4 of ARFCN 13 shown in FIG. 7). The 5 MHz wide bandwidth of the wideband receiver 204 captures signals associated with ARFCNs 1-25. According to one aspect, the wideband receiver 204 may have a linear phase response throughout its entire bandwidth so that all the signals received by the ARFCNs 1-25 may be demodulated if desired (e.g., different burst data on different ARFCNs may also be received and demodulated). However, in other aspects, only a portion of the bandwidth of the wideband receiver 204 may have a linear phase response, such as a 200 kHz wide region in the center of the receiver's bandwidth so that it may receive and demodulate data signals within the linear phase portion (e.g., ARFCN 13 in FIG. 7).

According to one aspect, the wideband receiver 204 may initially be in an inactive power state (e.g., power OFF or low power SLEEP state). It may then transition into an active power state (e.g., power ON state) and capture/receive a wideband signal 210 for a predetermined period of time t before powering back down into the inactive power state. During the time period t, the wideband receiver 204 is able to capture a portion 702 (e.g., a window) of the signals in each ARFCN being transmitted by the base stations. According to one aspect, the wireless device 102 may determine to make signal measurements before transitioning the wideband receiver 204 from the inactive power state to the active power state.

For example, the wireless device 102 may be in an idle mode when it wakes up synchronous to the serving base station for receiving SCH, BCCH, or PCH burst data on ARFCN 13 (e.g., the shaded, cross-hatched slot 4 of ARFCN 13 in FIG. 7). In the process, the wideband receiver 204 captures not only the SCH, BCCH, or PCH burst data on ARFCN 13, but also signals (e.g., at least a second channel) from ARFCNs 1-12 and 14-25. The signal strength determiner 206 may first apply a compensation filter to correct for any negative bias near the edges of the wideband receiver's 204 filter response (see e.g., FIG. 4). The signal strength determiner 206 may then make power level calculations for each of the ARFCNs 1-25 at the same time as it demodulates the burst data in ARFCN 13. For example, the filtering component 306 and the summing component 308 may extract each ARFCN's signal samples and perform an FFT to determine the power level (e.g., RSSI) of each ARFCN (see e.g., FIGS. 5 and 6). The power level calculations made can be used by the wireless device 102 to determine whether to associate (e.g., camp on) with a different base station (e.g., cell reselection) or handoff the call if in dedicated mode. Thus, these power level calculations and handoff/cell reselection decisions come free of cost such that no additional RF tuning to each individual ARFCN is needed independent to the reception of the burst data that was to be received anyway from the serving base station on ARFCN 13. That is, in the illustrated example, the power level determinations of ARFCNs 1-12 and 14-25 come free of cost (i.e., no additional time needs to be spent specifically tuning to each of these channels) while the wideband receiver 204 receives the burst data (e.g., SCH, PCH, or BCCH shaded, cross-hatched slot 4) on ARFCN 13 as it may be scheduled to do so.

As illustrated by the shading in FIG. 7, ARFCNs 5, 9, 13, 16, and 22 are active near the wireless device 102. Thus, when the wireless device 102 activates (e.g., enters an active power state from an inactive power state) its wideband receiver 204, the receiver 204 captures the signal portion 702 for a time period t that includes signals within ARFCNs 5, 9, 13, 16, and 22. The signal strength determiner 206 may then calculate power levels (e.g., RSSI) of ARFCNs 5, 9, 13, 16, and 22 within this time period t. The wireless device 102 may simultaneously receive and demodulate signal data associated with ARFCN 13. If the wireless device 102, cell monitoring module 202, and/or the signal strength determiner 206 determines that ARFCNs 5, 9, 16, and/or 22 satisfy certain power level metrics (e.g., have a high RSSI compared to ARFCN 13 or have a higher SNR than ARFCN 13), then a decision to perform a handoff or cell reselection may be executed.

As described above, since the described aspects include a digital implementation, parallel filtering of each ARFCN is possible. A technique like FFT can be used to obtain the power in each frequency bin. Although in some aspects the wireless device 102 "wakes up" from an idle mode to make the power level measurements and receive/demodulate the data signal from the serving base station, in other aspects the monitoring for signal power can be done any at time, as the GSM standard ensures that the ARFCN on which the BCH is transmitted is sending power over all 8 slots (e.g., always ON).

Figure 8:
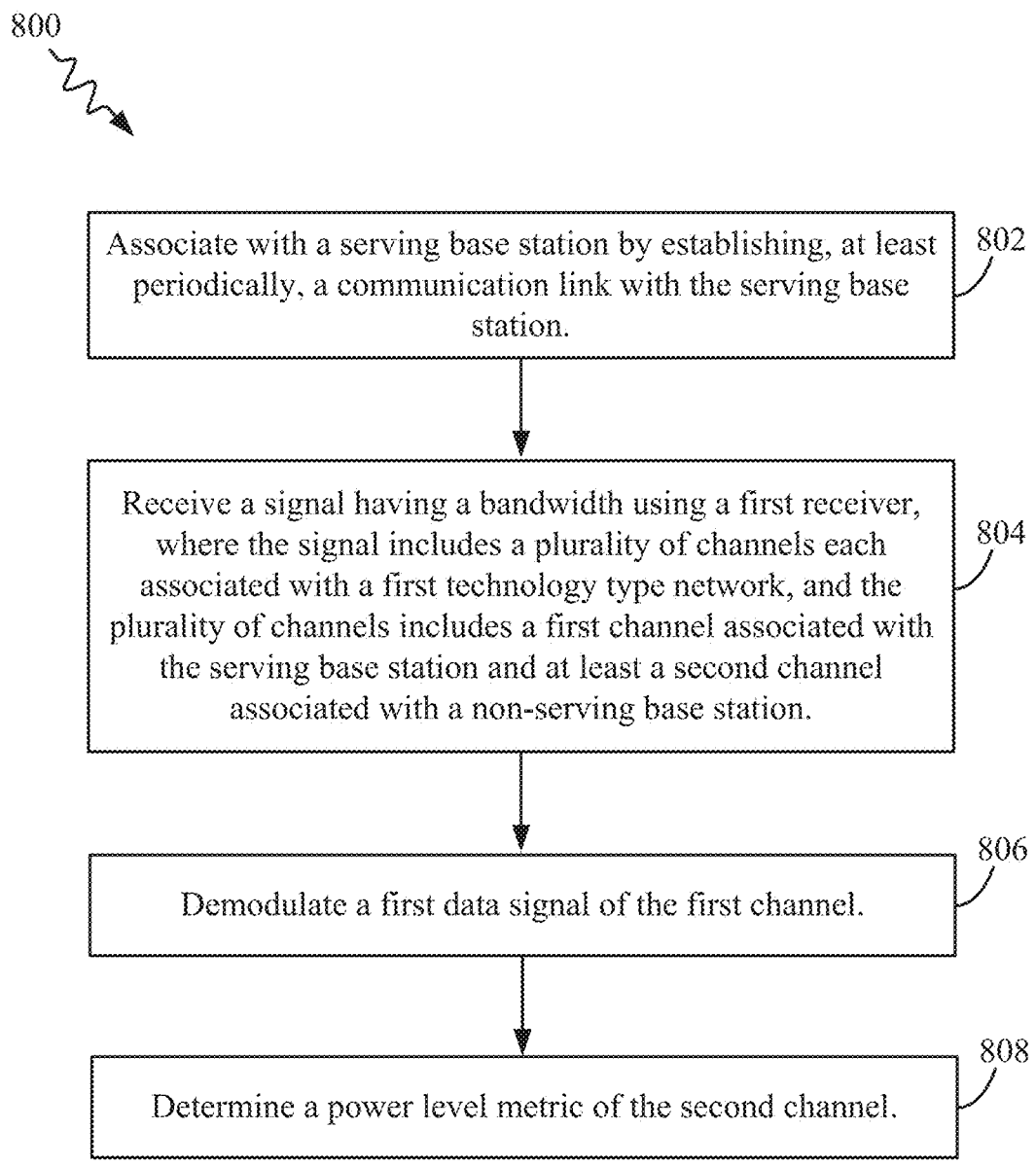
FIG. 8 illustrates a flow diagram for a method of monitoring radio channels in a wireless communication device according to some embodiments.

FIG. 8 illustrates a flow diagram 800 for a method of monitoring radio channels in a wireless communication device according to one aspect. The wireless communication device may associate with a serving base station by establishing, at least periodically, a communication link with the serving base station 802. The wireless communication device may further receive a signal having a bandwidth using a first receiver, where the signal includes a plurality of channels each associated with a first technology type network, and the plurality of channels includes a first channel associated with the serving base station and at least a second channel associated with a non-serving base station 804. The wireless communication device may further demodulate a first data signal of the first channel 806, and determine a power level metric of the second channel 808.

Figure 9:
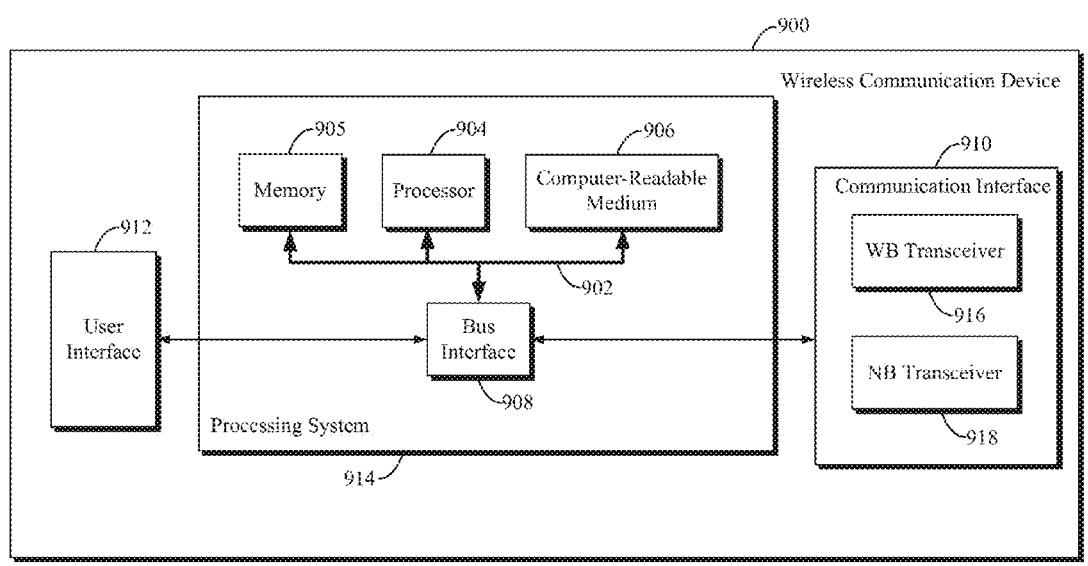
FIG. 9 illustrates a conceptual block diagram of a hardware implementation for a wireless communication device according to some embodiments.

FIG. 9 illustrates a conceptual block diagram of a hardware implementation for a wireless communication device 900 according to one aspect. The wireless communication device 900 may be representative of the wireless communication device 102 described above. The wireless communication device 900 may include a communication interface 910, a user interface 912, and a processing system 914. The processing system 914 may include a processor 904, a memory 905, a computer-readable medium 906, a bus interface 908, and a bus 902. The processing system 914 may be adapted to perform any of the steps, functions, and/or processes performed by a wireless communication device 102, the cell monitor 202, and/or the signal strength determiner 206 described with respect to FIGS. 1, 2, 3, 4, 5, 6, 7, and/or 8.

The processor 904 (e.g., processing circuit) may be one or more processors that are adapted to process data for the wireless communication device 900. For example, the processing circuit 904 may be a specialized processor, such as an application specific integrated circuit (ASIC) that serves as a: means for associating with a serving base station by establishing, at least periodically, a communication link with the serving base station; means for receiving a signal having a first bandwidth using a first receiver, the signal including a plurality of channels each associated with a first technology type network, the plurality of channels including a first channel associated with the serving base station and at least a second channel associated with a non-serving base station; means for demodulating a first data signal of the first channel; and means for determining a power level metric of the second channel.

Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 904 is also responsible for managing the bus 902, and executing software stored on the computer-readable medium 906 and/or memory 905. The software, when executed by the processor 904, causes the processing system 914 to perform the various functions, steps, and/or processes described above for the wireless communication device 102. The computer-readable medium 906 may be used for storing data that is manipulated by the processor 904 when executing software.

The memory circuit 905 may be non-volatile memory, such as but not limited to FLASH memory, magnetic or optical hard disk drives, etc. In some aspects, the memory storing the sector information and/or overhead messages (including configuration sequence number) may be volatile memory, such as DRAM (e.g., DDR SDRAM), SRAM, etc. that may be continuously powered so as to store the information indefinitely.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and the communication interface 910.

The communication interface 910 provides a means for communicating with other apparatus over a transmission medium. The communication interface 910 includes a wideband transceiver 916 and optionally a narrowband receiver 918 that allows the wireless communication device 900 to communicate with one or more wireless network nodes, such as one or more base stations and/or base station radio heads. According to one aspect the wideband transceiver 916 may include the wideband receiver 204 described above. The narrowband transceiver 918 may include the narrowband receiver 216 described above. Depending upon the nature of the apparatus, a user interface 912 (e.g., keypad, display, speaker, microphone, touchscreen display, etc.) may also be provided for the wireless communication device 900.

According to one example, the communication interface 910 and/or the wideband transceiver 916 may serve as a: means for associating with a serving base station by establishing, at least periodically, a communication link with the serving base station; and means for receiving a signal having a first bandwidth, the signal including a plurality of channels each associated with a first technology type network, the plurality of channels including a first channel associated with the serving base station and at least a second channel associated with a non-serving base station.

One or more of the components, steps, features, and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 6, and/or 9 may be configured to perform one or more of the methods, features, or steps described in FIGS. 4, 5, 7, and/or 8. The algorithms described herein may also be efficiently implemented in software and/or embedded in hardware.

Moreover, in one aspect of the disclosure, the processing circuit 904 illustrated in FIG. 9 may be a specialized processor (e.g., an application specific integrated circuit (e.g., ASIC)) that is specifically designed and/or hard-wired to perform the algorithms, methods, and/or steps described in FIGS. 4, 5, 7, and/or 8. Thus, such a specialized processor (e.g., ASIC) may be one example of a means for executing the algorithms, methods, and/or steps described in FIGS. 4, 5, 7, and/or 8. The computer-readable storage medium 906 may also store processor 904 readable instructions that when executed by a specialized processor (e.g., ASIC) causes the specialized processor to perform the algorithms, methods, and/or steps described in FIGS. 4, 5, 7, and/or 8.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of monitoring radio channels in a wireless communication device, comprising:
    associating with a serving base station by establishing, at least periodically, a communication link with the serving base station;
    receiving a signal having a bandwidth using a first receiver, the signal including a plurality of channels each associated with a first technology type network, the plurality of channels including a first channel associated with the serving base station and at least a second channel associated with a non-serving base station, the plurality of channels having different center frequencies;
    demodulating a first data signal of the first channel; and
    determining a power level metric of the second channel while simultaneously receiving the first channel and demodulating the first data signal.

2. The method of claim 1, further comprising: transitioning the first receiver from an inactive power state to an active power state for a predefined period of time to receive the signal.

3. The method of claim 2, further comprising: determining to make signal measurements prior to transitioning the first receiver from the inactive power state to the active power state.

4. The method of claim 3, wherein the determining to make signal measurements includes determining to perform a Global System for Mobile Communications (GSM) idle mode scan, the plurality of channels comprising GSM channels having a 200 kHz bandwidth.

5. The method of claim 1, further comprising: receiving signals associated with a second technology type network, the second technology type network different from the first technology type network.

6. The method of claim 5, wherein the first technology type network is based on time division multiple access (TDMA) and the second technology type network is based on code division multiple access (CDMA).

7. The method of claim 6, wherein the first technology type network is GSM, and the second technology type network is Wideband Code Division Multiple Access (W-CDMA) or Long Term Evolution (LTE).

8. The method of claim 1, further comprising: associating with the non-serving base station after determining the power level of the second channel exceeds a predefined threshold.

9. The method of claim 1, wherein the bandwidth of the signal is greater than or equal to three (3) times a channel bandwidth of each of the plurality of channels associated with the first technology type network.

10. The method of claim 1, wherein the bandwidth of the signal is substantially equal to a channel bandwidth of a carrier associated with the second technology type network.

11. The method of claim 1, wherein the bandwidth is greater than or equal to five (5) MHz and the plurality of channels each have a channel bandwidth of 200 kHz.

12. The method of claim 1, wherein the first data signal is one of a synchronization channel, a broadcast control channel, or a paging control channel.

13. The method of claim 1, wherein the first receiver has a receiver bandwidth that includes a substantially linear phase response for at least 200 kHz.

14. The method of claim 1, further comprising: applying a compensation filter to the received signal to correct for gain loss at a lower edge and an upper edge of the signal's bandwidth.

15. The method of claim 1, further comprising: applying a tunable band pass filter to the received signal to extract each channel of the plurality of channels.

16. The method of claim 1, further comprising:
    determining that the power level metric of the second channel satisfies a cell reselection criteria or a handover criteria;
    performing a cell reselection if the wireless communication device is in a non-dedicated mode; and
    performing a handover if the wireless communication device is in a dedicated mode.

17. The method of claim 16, wherein the power level metric satisfies the cell reselection criteria or the handover criteria when at least one of an absolute power level of the second channel exceeds a first predefined threshold, a relative power level of the second channel exceeds a power level of the first channel by at least a second predefined threshold, an absolute signal to noise ratio (SNR) of the second channel exceeds a third predefined threshold, a relative signal strength indicator (RSSI) of one of the second channel exceeds a fourth predefined threshold, and/or a relative SNR of the second channel exceeds an SNR value of the first channel by a fifth predefined threshold.

18. The method of claim 1, wherein the first data signal of the first channel is demodulated and the power level metric of the second channel is determined without retuning an RF center frequency of the first receiver.

19. A wireless communication device, comprising:
a first receiver adapted to
associate with a serving base station by establishing, at least periodically, a communication link with the serving base station, and
receive a signal having a bandwidth, the signal including a plurality of channels each associated with a first technology type network, the plurality of channels including a first channel associated with the serving base station and at least a second channel associated with a non-serving base station, the plurality of channels having different center frequencies; and
a processing circuit communicatively coupled to the first receiver, the processing circuit adapted to
demodulate a first data signal of the first channel, and
determine a power level metric of the second channel while simultaneously receiving the first channel and demodulating the first data signal.

20. The wireless communication device of claim 19, wherein the processing circuit is further adapted to: transition the first receiver from an inactive power state to an active power state for a predefined period of time to receive the signal.

21. The wireless communication device of claim 20, wherein the processing circuit is further adapted to: determine to make signal measurements prior to transitioning the first receiver from the inactive power state to the active power state.

22. The wireless communication device of claim 21, wherein the processing circuit adapted to determine to make signal measurements further causes the processing circuit to: determine to perform a Global System for Mobile Communications (GSM) idle mode scan, the plurality of channels comprising GSM channels having a 200 kHz bandwidth.

23. The wireless communication device of claim 19, wherein the first receiver is further adapted to: receive signals associated with a second technology type network different from the first technology type network.

24. The wireless communication device of claim 19, wherein the first receiver is further configured to: associate with the non-serving base station after the processing circuit determines that the power level of the second channel exceeds a predefined threshold.

25. The wireless communication device of claim 19, wherein the bandwidth of the signal is greater than or equal to three (3) times a channel bandwidth of each of the plurality of channels associated with the first technology type network.

26. The wireless communication device of claim 19, wherein the bandwidth is greater than or equal to five (5) MHz and the plurality of channels each have a channel bandwidth of 200 kHz.

27. The wireless communication device of claim 19, wherein the first data signal is a burst data signal.

28. The wireless communication device of claim 19, wherein the first receiver has a receiver bandwidth that includes a substantially linear phase response for at least 200 kHz.

29. The wireless communication device of claim 19, wherein the processing circuit is further adapted to: apply a compensation filter to the received signal to correct for gain loss at a lower edge and an upper edge of the signal's bandwidth.

30. The wireless communication device of claim 19, wherein the processing circuit is further adapted to: apply a tunable band pass filter to the received signal to extract each channel of the plurality of channels.

31. The wireless communication device of claim 19, wherein the processing circuit is further adapted to:
determine that the power level metric of the second channel satisfies a cell reselection criteria or a handover criteria;
perform a cell reselection if the wireless communication device is in a non-dedicated mode; and
perform a handover if the wireless communication device is in a dedicated mode.

32. The wireless communication device of claim 19, wherein the first data signal of the first channel is demodulated and the power level metric of the second channel is determined without retuning an RF center frequency of the first receiver.

33. The wireless communication device of claim 19, further comprising:
a second receiver communicatively coupled to the processing circuit and having a second bandwidth less than the signal bandwidth, wherein the second receiver is adapted to receive only a single channel of the plurality of channels of the first technology type network at once.

34. A wireless communications device, comprising:
means for associating with a serving base station by establishing, at least periodically, a communication link with the serving base station;
means for receiving a signal having a bandwidth, the signal including a plurality of channels each associated with a first technology type network, the plurality of channels including a first channel associated with the serving base station and at least a second channel associated with a non-serving base station, the plurality of channels having different center frequencies;
means for demodulating a first data signal of the first channel; and
means for determining a power level metric of the second channel while simultaneously receiving the first channel and demodulating the first data signal.

35. The wireless communication device of claim 34, further comprising: means for transitioning the means for receiving from an inactive power state to an active power state for a predefined period of time to receive the signal.

36. The wireless communications device of claim 34, further comprising:
means for determining that the power level metric of the second channel satisfies a cell reselection criteria or a handover criteria;
means for performing a cell reselection if the wireless communication device is in a non-dedicated mode; and
means for performing a handover if the wireless communication device is in a dedicated mode.

37. A non-transitory computer-readable storage medium comprising code for causing at least one processor of a wireless communication device to:
associate with a serving base station by establishing, at least periodically, a communication link with the serving base station;
receive a signal having a bandwidth using a first receiver, the signal including a plurality of channels each associated with a first technology type network, the plurality of channels including a first channel associated with the serving base station and at least a second channel associated with a non-serving base station, the plurality of channels having different center frequencies;

demodulate a first data signal of the first channel; and determine a power level metric of the second channel while simultaneously receiving the first channel and demodulating the first data signal.

38. The computer-readable storage medium of claim 37, comprising code for further causing the processor to: transition the first receiver from an inactive power state to an active power state for a predefined period of time to receive the signal.

39. The computer-readable storage medium of claim 37, comprising code for further causing the processor to:

determine that the power level metric of the second channel satisfies a cell reselection criteria or a handover criteria;

perform a cell reselection if the wireless communication device is in a non-dedicated mode; and perform a handover if the wireless communication device is in a dedicated mode.

* * * * *